US007558875B2

(12) United States Patent
Zhang et al.

(10) Patent No.: US 7,558,875 B2
(45) Date of Patent: Jul. 7, 2009

(54) MEASUREMENT-BASED CONSTRUCTION OF LOCALITY-AWARE OVERLAY NETWORKS

(75) Inventors: Xin Yan Zhang, Jiangsu (CN); Qian Zhang, Beijing (CN); Yongqiang Xiong, Beijing (CN); Wenwu Zhu, Basking Ridge, NJ (US)

(73) Assignee: Microsoft Corporation, Redmond, WA (US)

( * ) Notice: Subject to any disclaimer, the term of this patent is extended or adjusted under 35 U.S.C. 154(b) by 1167 days.

(21) Appl. No.: 10/662,574

(22) Filed: Sep. 15, 2003

(65) Prior Publication Data

US 2005/0060406 A1   Mar. 17, 2005

(51) Int. Cl.
*G06F 15/173* (2006.01)
(52) U.S. Cl. ..................................................... 709/238
(58) Field of Classification Search .................. None
See application file for complete search history.

(56) References Cited

U.S. PATENT DOCUMENTS

| 5,832,514 | A | 11/1998 | Norin et al. |
| 5,987,376 | A | 11/1999 | Olson et al. |
| 6,311,209 | B1 | 10/2001 | Olson et al. |
| 6,560,636 | B2 | 5/2003 | Cohen et al. |
| 2002/0184310 | A1* | 12/2002 | Traversat et al. ............ 709/204 |
| 2003/0147386 | A1 | 8/2003 | Zhang et al. |
| 2004/0047350 | A1* | 3/2004 | Zhang et al. ................ 370/392 |
| 2004/0085329 | A1* | 5/2004 | Xu et al. .................... 345/629 |
| 2004/0098502 | A1 | 5/2004 | Xu et al. |
| 2004/0162871 | A1* | 8/2004 | Pabla et al. ................. 709/201 |
| 2005/0135381 | A1 | 6/2005 | Dubnicki et al. |

FOREIGN PATENT DOCUMENTS

| WO | WO0001115 | 1/2000 |
| WO | WO2004092871 | 10/2004 |

OTHER PUBLICATIONS

Ratnasamy, S. Handley, M. Karp, R. Shenker, S., Topologically-aware overlay construction and server selection, IEEE Nov. 2002, vol. 3, On pp. 1190-1199.*
Banerjee, S. Kommareddy, C. Bhattacharjee, B. , Scalable peer finding on the Internet, IEEE Nov. 2002, vol. 3, On pp. 2205-2209.*

(Continued)

*Primary Examiner*—Ramy M Osman
*Assistant Examiner*—Marshall McLeod
(74) *Attorney, Agent, or Firm*—Lee & Hayes, PLLC

(57) ABSTRACT

Overlay network peers may be grouped so that each peer in a peer group has a similar transport network proximity measure with respect to the peers in other peer groups. A first set of transport network distances may include distances between a peer group and peer group neighbors of the peer group. A second set of distances may include distances between a peer and the peer group neighbors of the peer group. The peer may decide to join the peer group if the first set of distances is near to the second set. A first peer group may query a second peer group for the second peer group's neighboring peer groups. The distance between the first peer group and each of the second peer group's neighbors may be measured. Overlay network connections may be established between the first peer group and the closest of the second peer group's neighbors.

18 Claims, 10 Drawing Sheets

OTHER PUBLICATIONS

Barabási et al., "Emergence of Scaling in Random Networks," *Science*, vol. 286, pp. 509-512 (Oct. 1999).

Labavitz et al., "Internet Routing Instability," *IEEE/ACM Transactions on Networking*. vol. 6, No. 5, pp. 515-528 (Oct. 1998).

Medina et al., "Brite: Universal Topology Generation from a User's Perspective," *Technical Report*, BU-CS-TR-2001-003, Boston University (Apr. 2001).

Medina et al., "On the Origin of Power Laws in Internet Topologies," *ACM SIGCOMM Computer Communication Review*, vol. 30, No. 2, pp. 1-47 (2000).

Medina et al., "BRITE: An Approach to Universal Topplogy Generation," *Proceedings of MASCOTS 2001*, IEEE Computer Society, pp. 1-8 (Aug. 2001).

Waxman, Bernard M., "Routing of Multipoint Connections," *IEEE Journal on Selected Areas in Communications*, vol. 6, No. 9, pp. 1617-1622 (Dec. 1988).

Demirbas et al. "Peer-to-peer spatial queries in sensor networks", Peer-To-Peer Computing 2003, Proceedings Third International Conference Piscataway, NJ, USA, IEEE, Sep. 1, 2003, pp. 32-39.

Tim Hsin-Ting Hu et al. "General Clusters in peer-to-peer networks", Networks, 2003, ICON 2003. The 11th IEEE International Conference, Piscataway, NJ, USA, IEEE Sep. 28, 2003, pp. 27277-27282.

Zhichen et al. "Building topology—aware overlays using globarl soft-state", Proceedings of the 23rd Internatinoal Conferenc eon Distributed Computing Systems, ICDCS 2003, Providence, RI, vol. conf. 23, May 19, 2003, pp. 500-508.

Anonymous, "The Gnutella Protocol Specification v0.4 (Document Revision 1.2)", 10 pgs. (Jun. 15, 2001) <http://www9.limewire.com/developer/gnutella_protocol_0.4.pdf>.

Clarke et al., "Freenet: A Distributed Anonymous Information Storage and Retrieval System", H. Federrath (Ed.), *Anonymity 2000*, LNCS 2009, pp. 46-66 (2001).

Hong et al., "Dynamic Group Support in LANMAR Routing Ad Hoc Networks", *IEEE*, pp. 304- 308 (2002).

Hoschek, Wolfgang, "A Unified Peer-to Peer Database Framework for Scalable Service and Resource Discovery", M. Parasher (Ed.), *GRIG 2002*, LNCS 2536, pp. 126-144 (2002).

Joa-Ng, M. and I-Tai Lu, "A GPS-based Peer-to-Peer Hierarchical Link State Routing for Mobile Ad Hoc Networks", *IEEE 51st Vehicular Technology Conference Proceedings*, vol. 3, pp. 1752-1756 (2000).

Joa-Ng, M. and I-Tai Lu, "A Peer-to-Peer Zone-Based Two-Level Link State Routing for Mobile Ad Hoc Networks", *IEEE Journal on Selected Areas in Communications*, vol. 17, No. 8, pp. 1415-1425 (Aug. 1999).

Krishnamurthy et al., "Early Measurements of a Cluster-Based Architecture for P2P Systems", *IMW '01*, ACM, pp. 105-109 (2001).

Kwon et al., "An Efficient Peer-to-Peer File Sharing Exploiting Hierarchy and Asymmetry", *IEEE*, pp. 226-233 (2003).

Labovitz et al., "Internet Routing Instability", *SIGCOMM '97*, ACM, pp. 115-126 (1997).

Legedza et al., "Using Network-level Support to Improve Cache Routing", Hamilton et al. (Ed.), *Computer Networks and ISDN Systems: The International Journal of computer and Telecommunications Networking*, vol. 30, No. 22-23, pp. 2193-2201 (1998).

Portmann, M. and Aruna Seneviratne, "The Cost of Application-level Broadcast in a Fully Decentralized Peer-to-peer Network", *Proceedings ISCC 2002 Seventh International Symposium*, pp. 941-946 (2002).

Portmann et al., "The Cost of Peer Discovery and Searching in the Gnutella Peer-to-Peer File Sharing Protocol", *Proceedings Ninth IEEE International Conference on Networks*, pp. 263-268 (2001).

Ratnasamy et al., "A Scalable Content-Addressable Network", *SIGCOMM '01*, ACM, pp. 161-172 (2001).

Rowstron et al., "Pastry: Scalable, Decentralized Object Location and Routing for Large-scale Peer-to-Peer Systems", *Proceedings of the 18th IFIP/International Conference on Distributed Platforms*, Middleware 2001, 22pgs. (2001).

Saroiu et al., "A Measurement Study of Peer-to-Peer File Sharing Systems", *Technical Report #UW-CSE-01-06-02*, Department of Computer Science & Engineering, University of Washington, Seattle, Washington, 14pgs (2001).

Stoica et al., "Chord: A Scalable Peer-to-Peer Lookup Service for Internet Applications", *SIGCOMM '01*, ACM, pp. 149-160 (2001).

Sunaga et al., "Advanced Peer-to-Peer Network Platform for Various Services-SIONet (Semantic Information Oriented Network", *Proceedings of the Second International Conference on Peer-to-Peer Computing*, IEEE, pp. 169-170 (2002).

Xiao et al., "On Reliable and Scalable Peer-to-Peer Web Document Sharing", *Proceedings of the International Parallel and Distributed Processing Symposium*, IEEE, pp. 23-30 (2002).

Zhang et al., "gMeasure: A Group-based Network Performance Measurement Service for Peer-to-Peer Applications", *IEEE Globecom 2002*, 5 pgs (2002).

Zhao et al., "Tapestry: An Infrastructure for Fault-tolerant Wide-area Location and Routing", Report No. UCB/CSD-01-1141, Computer Science Division (EECS), University of California, Berkeley, California, 27 pgs (2001).

\* cited by examiner

US 7,558,875 B2

MEASUREMENT-BASED CONSTRUCTION OF LOCALITY-AWARE OVERLAY NETWORKS

FIELD OF THE INVENTION

This invention pertains generally to computer networks and, more particularly, to computer networks capable of supporting one or more overlay networks.

BACKGROUND OF THE INVENTION

The number of applications that take advantage of services offered by computer networks is large and growing. Such applications include interactive multimedia communication, multimedia file retrieval, streaming media distribution, and distributed computing. A basic service typically provided by a modern computer network is the ability for each computer in the network to establish a communication connection with any other computer in the network. Particularly in large computer networks, it is common for this service to be provided by sophisticated routing rather than, for example, brute each-to-each (N×N) connectivity. For at least the purposes of this description, the computer network involved in providing this basic service is called the transport network.

Various application architectures may utilize the transport network in different ways. For example, a client-server architecture may have a centralized server component and a number of client components, located throughout the transport network, that establish more or less temporary communication connections with the server as required. Another example is the recently popular peer-to-peer (P2P) architecture. Peer-to-peer architectures typically avoid centralized elements, instead relying on peers with roughly equivalent functionality to provide the backbone of the application. The benefits of such decentralization may include avoiding single points of failure and vulnerability to attack, as well as good theoretical scalability.

There are various conventional schemes for arranging peers in a peer-to-peer architecture. Examples of such schemes include the CAN architecture described by Ratnasamy et al. in *A Scalable Content-Addressable Network*, Proceedings of ACM SIGCOMM, August 2001, the Chord architecture described by Stoica et al. in Chord: *A scalable Peer-to-peer Lookup Service for Internet Applications*, Proceedings of ACM SIGCOMM, August 2001, the Pastry architecture described by Rowstron et al. in *Pastry: Scalable, decentralized object location and routing for large-scale peer-to-peer systems*, Proceedings of the 18th IFIP/ACM International Conference on Distributed Systems Platforms (Middleware 2001), November 2001, and the Tapestry architecture described by Zhao et al. in *Tapestry: An Infrastructure for Fault-tolerant Wide-area Location and Routing*, Report No. UCB/CSD-01-1141, Computer Science Division, University of California, Berkeley, April 2001. In general, peers in a peer-to-peer architecture are arranged in a network, called an overlay network, which may be considered independently of the underlying transport network.

A problem with constructing the overlay network of a peer-to-peer architecture independently of the transport network is that peers that are neighbors in the overlay network may be far from each other in the underlying transport network and so, for example, may experience long delays when communicating with each other. This discord between the overlay network and the transport network is not wholly undesirable because, for example, it may enable the overlay network, and thus an application utilizing it, to tolerate failures in the transport network. However, many applications that desire the advantages of overlay networks, particularly those with high quality of service (QoS) requirements, would benefit from a system and method for constructing overlay networks that make efficient use of the underlying transport network.

BRIEF SUMMARY OF THE INVENTION

This section presents a simplified summary of some embodiments of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In an embodiment of the invention, overlay network peers are grouped so that each peer in a peer group has a similar transport network proximity measure with respect to the peers in other peer groups.

A first set of transport network distances may include transport network distances between an overlay network peer group and peer group neighbors of the overlay network peer group. A second set of transport network distances may include transport network distances between a peer and the peer group neighbors of the overlay network peer group. In an embodiment of the invention, the peer decides to join the overlay network peer group if the first set of transport network distances is near to the second set of transport network distances. In an embodiment of the invention, a join locality-aware overlay module is configured to determine if the first set of transport network distances is near to the second set of transport network distances.

In an embodiment of the invention, a first overlay network peer group queries a second overlay network peer group for the second peer group's neighboring peer groups. Each overlay network peer group has at least one neighboring peer group unless it is the first peer group in an overlay network. The transport network distance between the first overlay network peer group and each of the second peer group's neighbors is measured. At least one overlay network connection is established between the first overlay network peer group and the closest of the second peer group's neighbors.

BRIEF DESCRIPTION OF THE DRAWINGS

While the appended claims set forth the features of the invention with particularity, the invention and its advantages are best understood from the following detailed description taken in conjunction with the accompanying drawings, of which:

DETAILED DESCRIPTION OF THE INVENTION

Prior to proceeding with a description of the various embodiments of the invention, a description of a computer and networking environment in which the various embodiments of the invention may be practiced is now provided. Although not required, the invention will be described in the general context of computer-executable instructions, such as program modules, being executed by a computer. Generally, programs include routines, objects, components, data structures and the like that perform particular tasks or implement particular abstract data types. The term "program" as used herein may connote a single program module or multiple program modules acting in concert. The terms "computer" and "computing device" as used herein include any device that electronically executes one or more programs, such as personal computers (PCs), hand-held devices, multi-processor systems, microprocessor-based programmable consumer electronics, network PCs, minicomputers, tablet PCs, laptop computers, consumer appliances having a microprocessor or microcontroller, routers, gateways, hubs and the like. The invention may also be employed in distributed computing environments, where tasks are performed by remote processing devices that are linked through a communications network. In a distributed computing environment, programs may be located in both local and remote memory storage devices.

Figure 1:
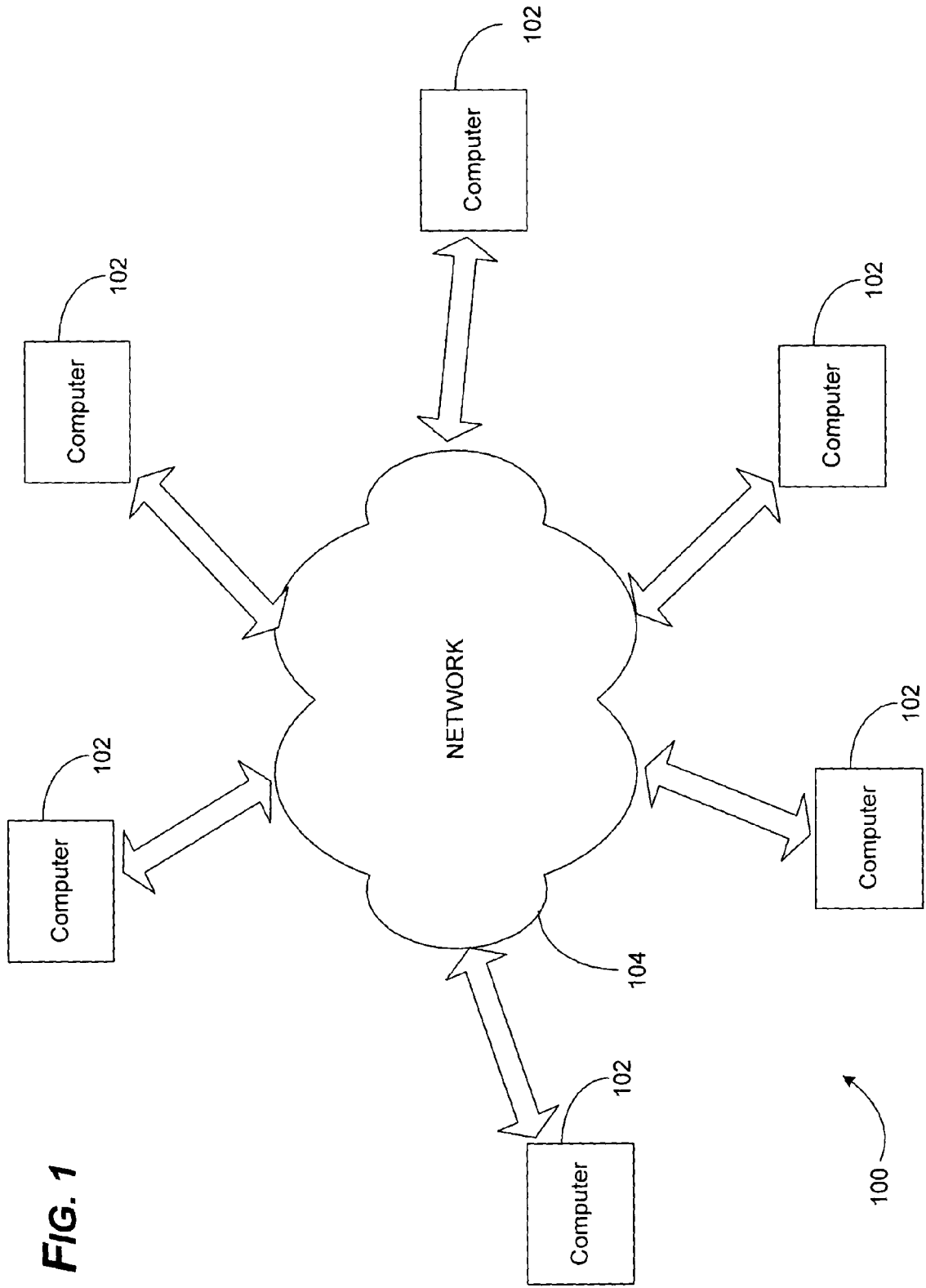
FIG. 1 is a schematic diagram illustrating computers connected by a transport network.

An example of a computer networking environment suitable for incorporating aspects of the invention is described with reference to FIG. 1. The example computer networking environment 100 includes several computers 102 communicating with one another over a network 104, represented by a cloud. Network 104 may include many well-known components, such as routers, gateways, hubs, etc. and allows the computers 102 to communicate via wired and/or wireless media. When interacting with one another over the network 104, one or more of the computers 102 may act as clients, servers or peers with respect to other computers 102. Accordingly, the various embodiments of the invention may be practiced on clients, servers, peers or combinations thereof, even though specific examples contained herein may not refer to all of these types of computers. Computer networking environment 100 is an example of a transport network.

Figure 2:
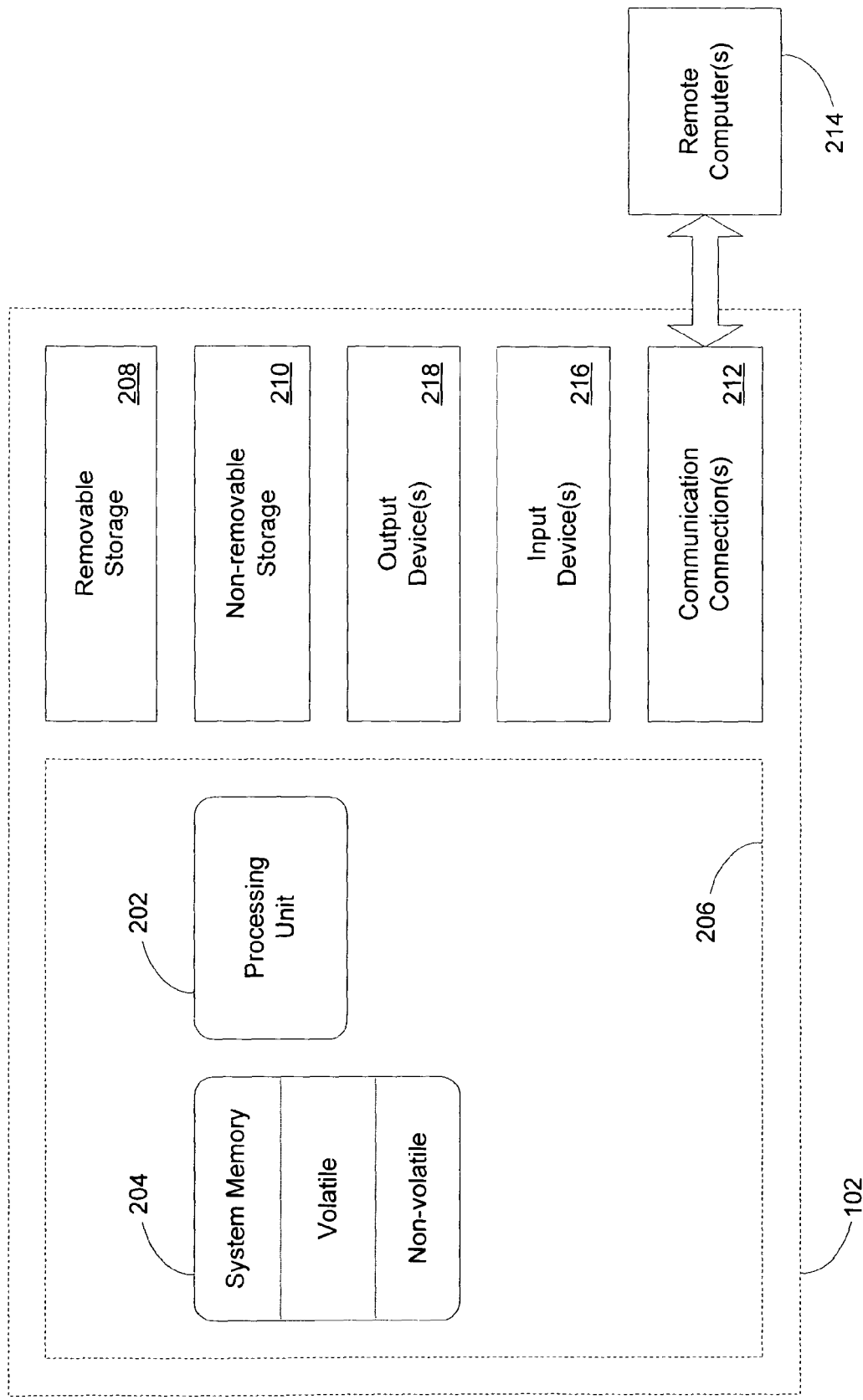
FIG. 2 is a schematic diagram generally illustrating an example computer system usable to implement an embodiment of the invention.

Referring to FIG. 2, an example of a basic configuration for the computer 102 on which aspects of the invention described herein may be implemented is shown. In its most basic configuration, the computer 102 typically includes at least one processing unit 202 and memory 204. The processing unit 202 executes instructions to carry out tasks in accordance with various embodiments of the invention. In carrying out such tasks, the processing unit 202 may transmit electronic signals to other parts of the computer 102 and to devices outside of the computer 102 to cause some result. Depending on the exact configuration and type of the computer 102, the memory 204 may be volatile (such as RAM), non-volatile (such as ROM or flash memory) or some combination of the two. This most basic configuration is illustrated in FIG. 2 by dashed line 206.

The computer 102 may also have additional features/functionality. For example, computer 102 may also include additional storage (removable 208 and/or non-removable 210) including, but not limited to, magnetic or optical disks or tape. Computer storage media includes volatile and non-volatile, removable and non-removable media implemented in any method or technology for storage of information, including computer-executable instructions, data structures, program modules, or other data. Computer storage media includes, but is not limited to, RAM, ROM, EEPROM, flash memory, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 102. Any such computer storage media may be part of computer 102.

The computer 102 preferably also contains communications connections 212 that allow the device to communicate with other devices such as remote computer(s) 214. A communication connection is an example of a communication medium. Communication media typically embody computer readable instructions, data structures, program modules or other data in a modulated data signal such as a carrier wave or other transport mechanism and includes any information delivery media. By way of example, and not limitation, the term "communication media" includes wireless media such as acoustic, RF, infrared and other wireless media. The term "computer-readable medium" as used herein includes both computer storage media and communication media.

The computer 102 may also have input devices 216 such as a keyboard/keypad, mouse, pen, voice input device, touch input device, etc. Output devices 218 such as a display, speakers, a printer, etc. may also be included. All these devices are well known in the art and need not be described at length here.

In the description that follows, the invention will be described with reference to acts and symbolic representations of operations that are performed by one or more computing devices, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Proximity in a communications network may be measured in terms of time. Suitable proximity metrics/measures include send-receive latency, round trip time and network routing hops, so that, for example, two points in the network may be said to be close if the round trip time between them is low or far if the number of hops is high. There are at least two such distances associated with each pair of peers in an overlay network: a first distance as measured through the overlay network and a second distance as measured through the underlying transport network. The metrics may have the same value, for example, if each metric is round trip time, or they may differ, for example, a direct connection may exist between two peers in the overlay network when five routing hops are required through the transport network. Unless stated otherwise, or clearly contradicted by context, references to the distance between two peers in the description below will refer to the distance as measured through the underlying transport network. In an embodiment of the invention, the overlay network is constructed so as to minimize the average transport network distance between neighboring peers.

Figure 3:
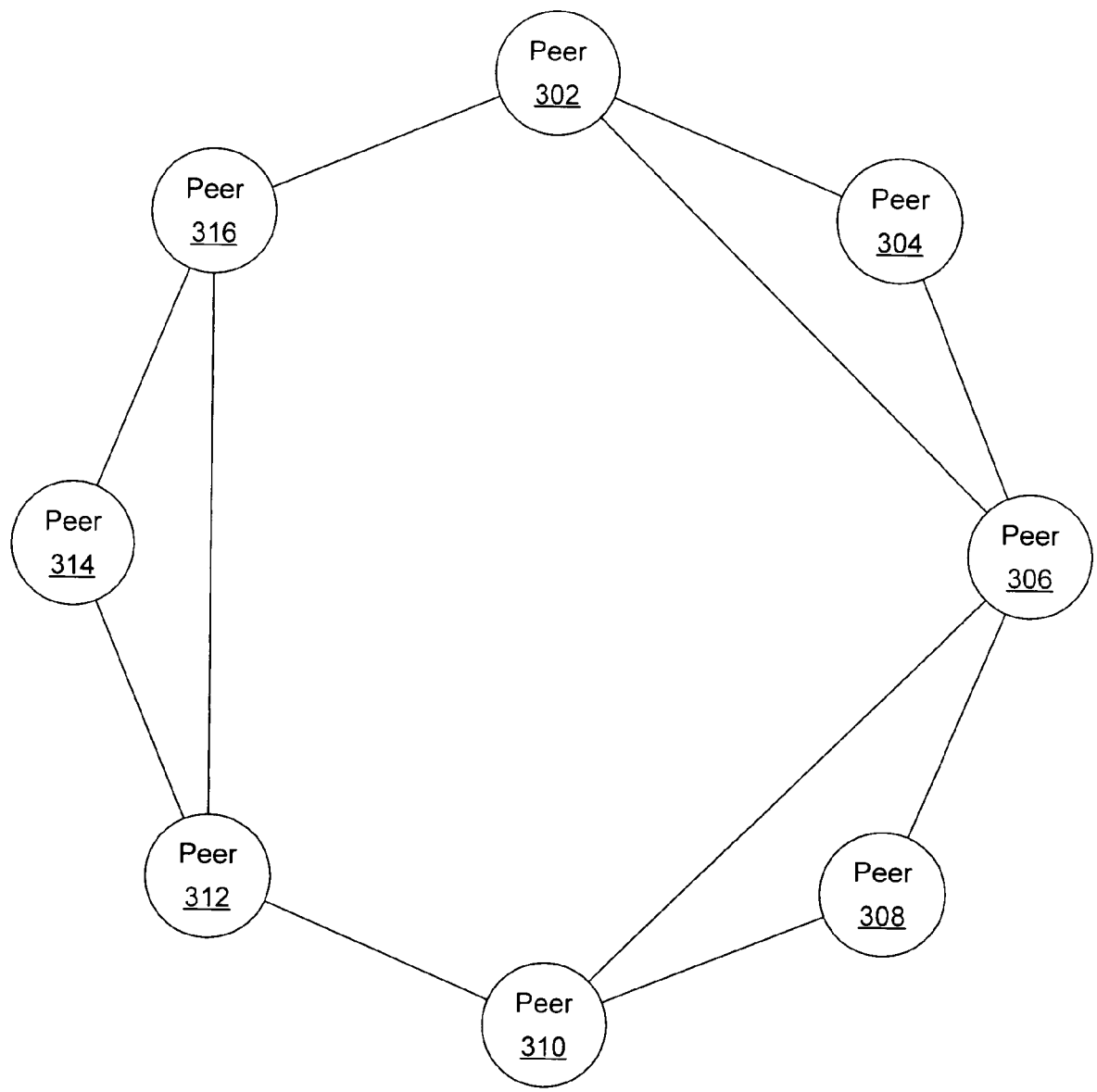
FIG. 3 is a schematic diagram of an example overlay network constructed independently of its underlying transport network.

FIG. 3 illustrates an example overlay network 300 constructed independently of its underlying transport network. Accordingly, the illustrated distances between peers in FIG. 3 are independent of the underlying transport network distances between the peers. Such overlay networks are known in the art, so only some of their details are described here. The computer networking environment 100 discussed with reference to FIG. 1 is an example of a suitable transport network. The computers 102 of the transport network host the peers 302, 304, 306, 308, 310, 312, 314, 316 of the overlay network 300. Both computers and peers may be considered as nodes in the transport network. The relationship between a peer (e.g., the peer 302) and a computer (e.g., the computer 102) is not necessarily one-to-one. A single computer may host a plurality of peers, for example, peer 302 and peer 316 may be hosted by a single computer 102. A single peer (e.g., peer 306) may be hosted by a plurality of computers 102.

The peer interconnection details of overlay network 300 are relatively unimportant as the illustration is intended to be schematic of any overlay network constructed independently of its underlying transport network, however, they are described here for completeness. Peer 302 is directly connected to (is a neighbor in the overlay network of) peers 304, 306 and 316. Peer 304 is connected to peers 302 and 306. Peer 306 is connected to peers 302, 304, 308 and 310. Peer 308 is connected to peers 306 and 310. Peer 310 is connected to peers 306, 308 and 312. Peer 312 is connected to peers 310, 314 and 316. Peer 314 is connected to peers 312 and 316. Peer 316 is connected to peers 302, 312 and 314. Peers connected in this sense need not have an associated active transport network communication connection (e.g., communication connection 212 of FIG. 2), but each such connection typically does have some transport network and/or overlay network resources allocated to it.

Figure 4:
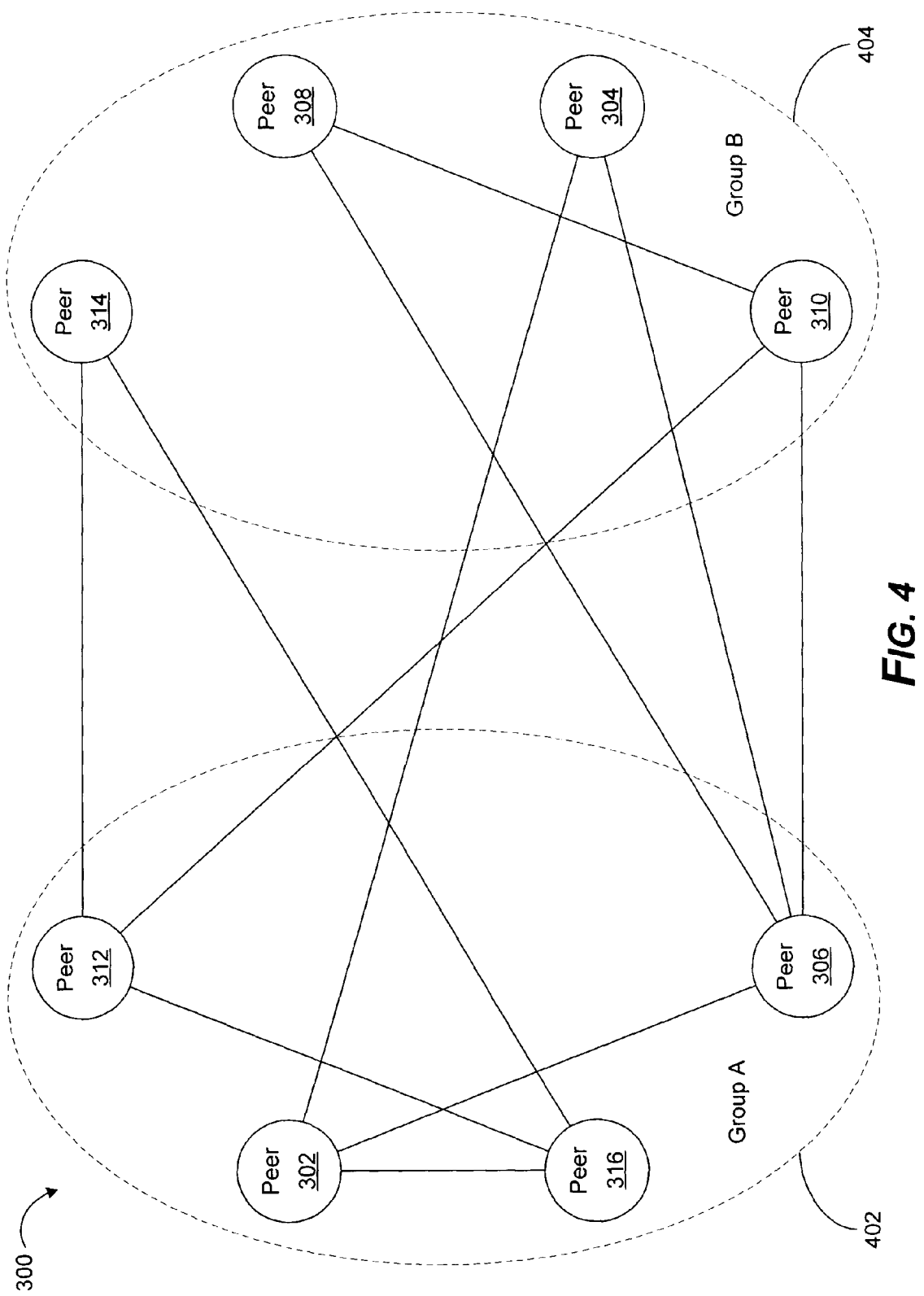
FIG. 4 is a schematic diagram of the example overlay network of FIG. 3 in which the illustrated distances between the peers are representative of the transport network distances between the peers.

FIG. 4 shows the same overlay network 300 as FIG. 3 except that the illustrated distances between peers in FIG. 4 are representative of the distances (i.e., the proximity metrics) between the peers in the underlying transport network. Peers 302, 306, 312 and 316 are close together in the transport network. They are within a first transport network locality delimited by dashed line 402 and together form peer group A. Peers 304, 308, 310 and 314 are also close together in the transport network. They are within a second transport network locality delimited by dashed line 404 and form peer group B. Peer group A and peer group B are relatively far from each other in the transport network, that is, in this example, connections between peers in different groups are assumed to be long distance connections.

Peer 302 and peer 316 are neighbors in the overlay network 300. FIG. 4 shows that peer 302 and peer 316 are also close together in the transport network. Peer 304 and peer 314 are close together in the transport network, but overlay network messages from peer 304 to peer 314 routed through even the shortest path in the overlay network 300 are first sent from peer 304 to peer 302, and then from peer 302 to peer 316, and finally from peer 316 to peer 314. The overlay network 300 connections from peer 304 to peer 302 and from peer 316 to peer 314 are long distance connections. Even though peer 304 and peer 314 are close together in the transport network, overlay network messages routed between them incur the cost of two long distance connections. This is an example of an inefficiency targeted by an embodiment of the invention.

Figure 5:
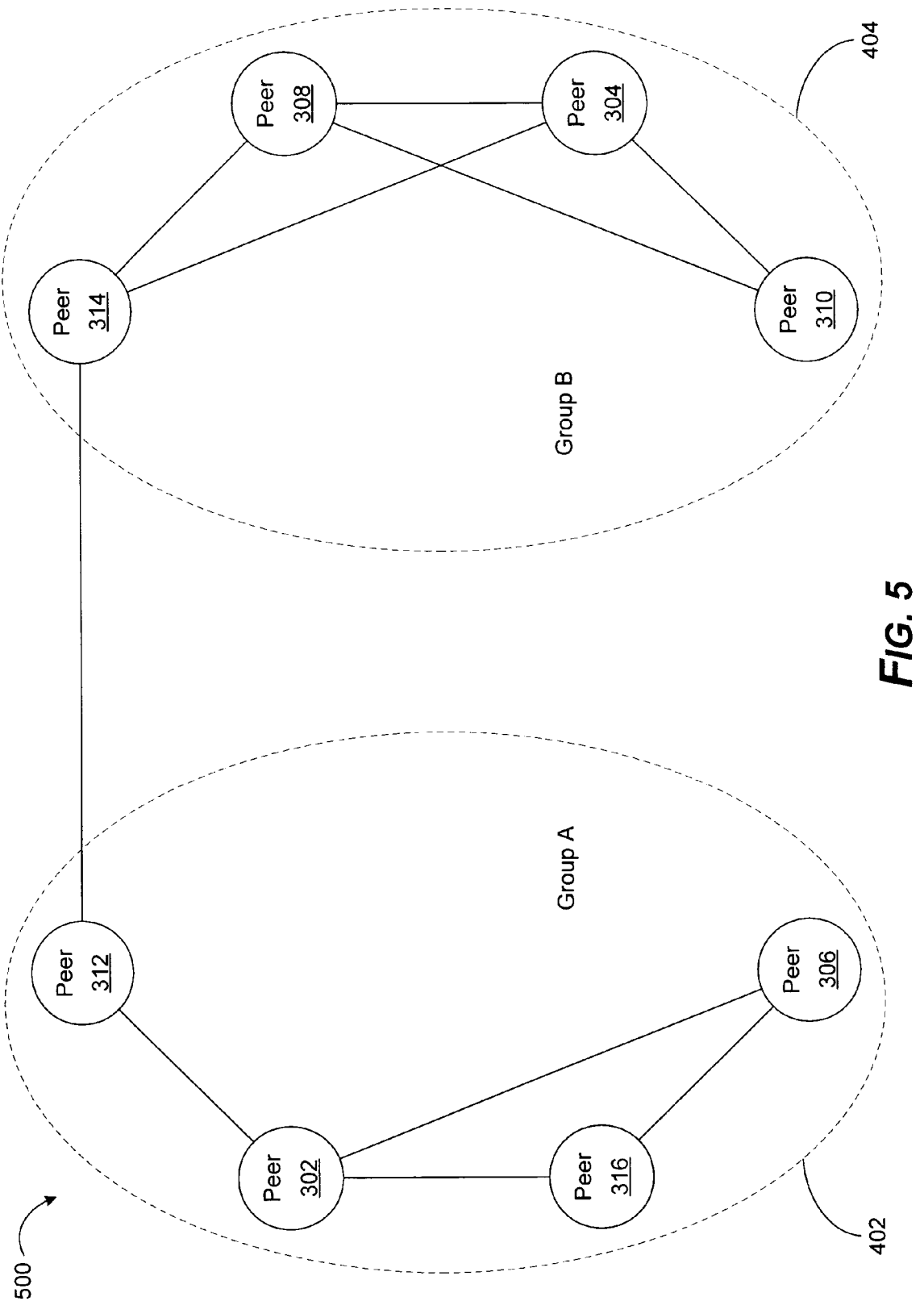
FIG. 5 is a schematic diagram of an example locality-aware overlay network in accordance with an embodiment of the invention.

FIG. 5 shows the same peers and transport network localities as FIG. 4, but in FIG. 5, the example peer-to-peer overlay network 500 has been constructed with an awareness of the underlying transport network localities 402 and 404, that is, the overlay network 500 is locality-aware in accordance with an embodiment of the invention. In comparison with the overlay network 300 of FIG. 3 and FIG. 4, the overlay network 500 has fewer long distance (i.e., inter-group) connections. In an embodiment of the invention, the average transport network distance between neighboring peers in the overlay network is reduced by grouping the peers of the overlay network in transport network localities and minimizing the number of inter-group connections.

Figure 6:
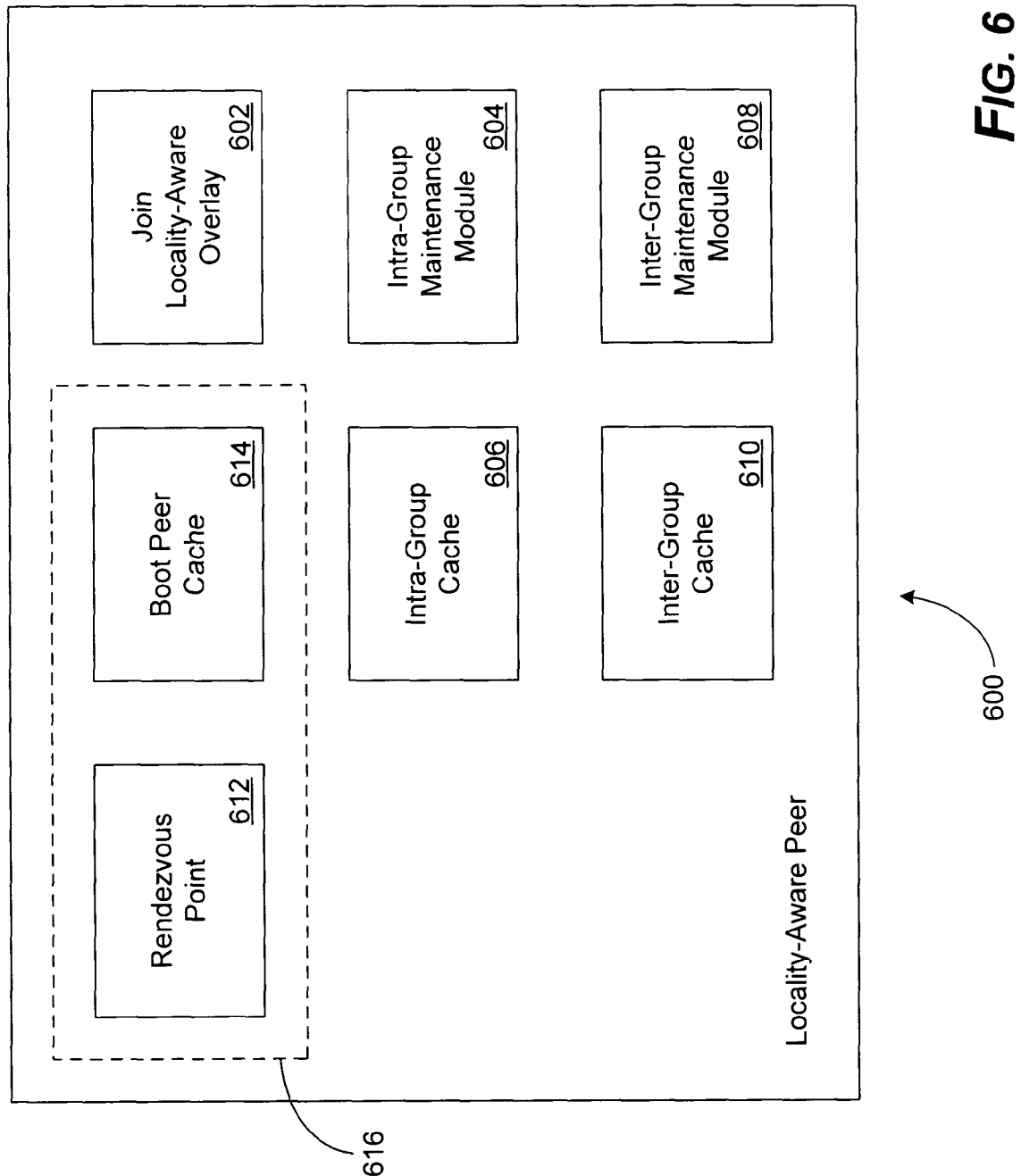
FIG. 6 is a block diagram of an example modular software architecture suitable for implementing a locality-aware peer in accordance with an embodiment of the invention.

In keeping with the decentralized nature of overlay networks, it is desirable that each peer of a locality-aware overlay network in accordance with an embodiment of the invention is able to detect transport network localities and self-organize into interconnected groups. FIG. 6 illustrates an example modular software architecture for a locality-aware peer 600. The locality-aware peer 600 has a join locality-aware overlay module 602 which enables the locality-aware peer 600 to join a locality-aware overlay network peer group in its transport network locality. An intra-group maintenance module 604 maintains an intra-group cache 606. The intra-group cache 606 includes information regarding the peer group in which the locality-aware peer 600 participates. An inter-group maintenance module 608 maintains an inter-group cache 610. The inter-group cache 610 includes information regarding peer groups other than the peer group in which the locality-aware peer 600 participates.

A rendezvous point module 612 maintains and provides access to a boot peer cache 614. The boot peer cache 614 includes a list of one or more peers in the overlay network that may be utilized as starting points for the locality-aware peer 600 when it is searching for a peer group in its transport network locality. The dashed line 616 indicates that, in various embodiments of the invention, the rendezvous point module 612 and the boot peer cache 614 may be incorporated by all, some or none of the peers in the locality-aware overlay network. The rendezvous point module 612 and the boot peer cache 614 may be incorporated into a peer (not necessarily the locality-aware peer 600) at a well-known (or easily discoverable) transport network location that is dedicated to providing rendezvous point functionality. Lightweight Directory Access Protocol (LDAP) and Dynamic Host Configuration Protocol (DHCP) servers and the like may be utilized to implement rendezvous point functionality. Distributing multiple boot peers (i.e., peers incorporating the rendezvous point module 612 and the boot peer cache 614) throughout the overlay network may enhance the robustness and fault-tolerance of the overlay network.

In an embodiment of the invention, the locality-aware peer 600 joining the locality-aware overlay network (e.g., the locality-aware overlay network 500 of FIG. 5 or the locality-aware overlay network 700 described below with reference to FIG. 7) either joins a peer group in the transport network locality of the peer 600 or, if the peer 600 fails to find a peer group in its locality, the peer 600 establishes a new peer group. When joining a particular peer group, the locality-aware peer 600 may initiate overlay network connections to peers that are members of that peer group. When establishing a new peer group, the locality-aware peer 600 may initiate overlay network connections to peers in existing peer groups that are nearby in the transport network. The establishment of new peer groups may be more common when the locality-aware overlay network is smaller, that is, when the locality-aware overlay network incorporates fewer locality-aware peers 600.

Figure 7:
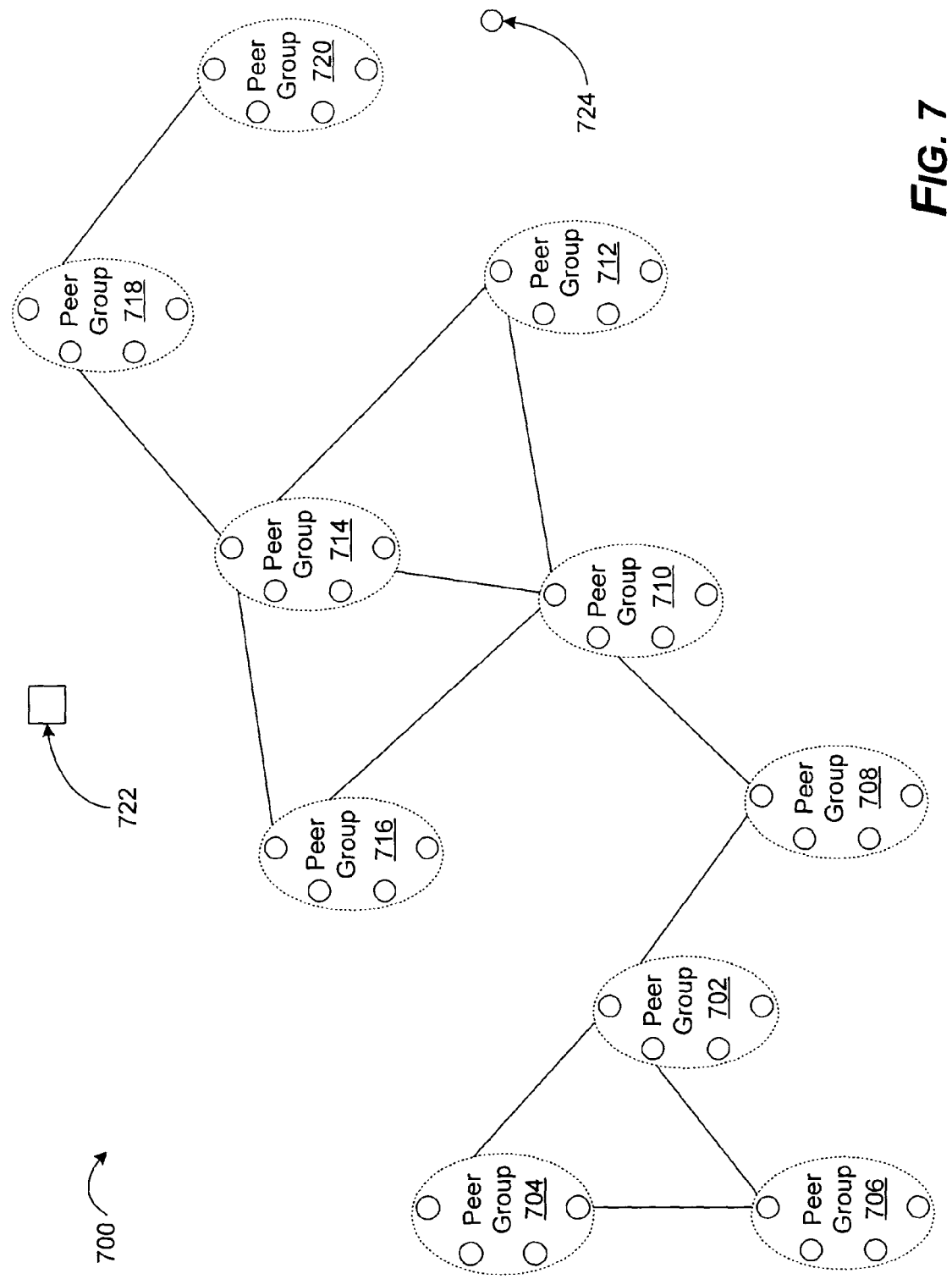
FIG. 7 is a schematic diagram of peer group network aspects of an example locality-aware overlay network in accordance with an embodiment of the invention.

FIG. 7 illustrates an example of a locality-aware overlay network 700 with multiple peer groups in accordance with an embodiment of the invention. Each peer group 702, 704, 706, 708, 710, 712, 714, 716, 718, 720 includes at least one locality-aware peer. The locality-aware overlay network 700 has a rendezvous point 722. Locality-aware peer 724 of FIG. 7 has not yet joined overlay network 700.

Each peer group has at least one overlay network connection to another peer group, that is, at least one of the peers in each peer group has an overlay network connection to a peer in another peer group. In overlay network 700 each peer group has at least one connection with another peer group that is nearby in the transport network. For example, peer groups 704, 706 and 708 are relatively nearby peer group 702 in the transport network and peer group 702 has a direct overlay network connection to each of those peer groups, that is, peer groups 704, 706 and 708 are peer group neighbors of peer group 702. In contrast, peer group 718 is relatively distant from peer group 702 in the transport network and peer group 702 does not have a direct overlay network connection to peer group 718. Peer group 702 and peer group 718 are not neighbors in overlay network 700. In an embodiment of the invention, a peer group may have an overlay network connection to a random other peer group, as well as nearby peer groups, in order to, for example, reduce the risk of overlay network partition due to localized transport network failure.

Figure 9:
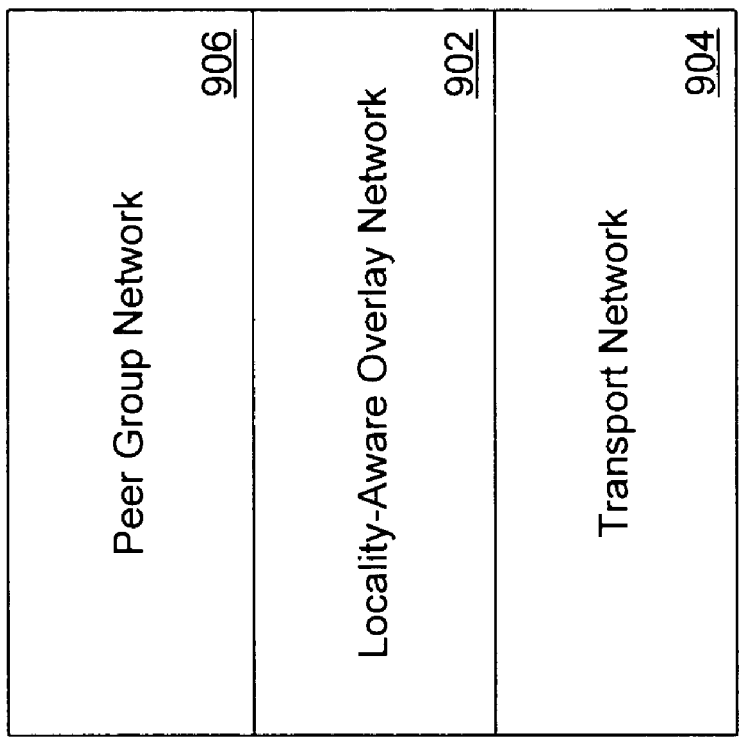
FIG. 9 is a schematic diagram of network layers associated with a locality-aware overlay network in accordance with an embodiment of the invention.
Figure 8:
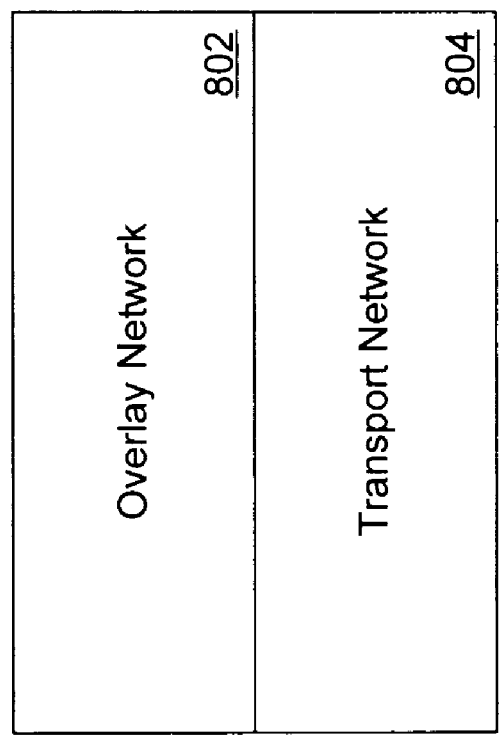
FIG. 8 is a schematic diagram of network layers associated with a conventional overlay network.

Peer groups including locality-aware peers 600 may be considered as nodes in a peer group network. FIG. 8 is a schematic representation of network layers associated with a conventional overlay network. In FIG. 8, conventional overlay network 802 is supported by transport network 804. FIG. 9 is a suitable schematic representation of network layers associated with a locality-aware overlay network. A locality-aware overlay network 902 (e.g., the locality-aware overlay network 700) is supported by transport network 904 (which may be the same as transport network 804 of FIG. 8). In an embodiment of the invention, as part of maintaining the locality-aware overlay network 902, the locality-aware overlay network 902 maintains a peer group network 906.

Each peer group may include a peer that is a leader of the peer group (a "peer group leader"). The peer establishing a new peer group is typically the first leader of the new peer group. Each locality-aware peer 600 in a peer group may become the leader of the peer group. In an embodiment of the invention, inter-group overlay network connections are between peer group leaders. For example, in FIG. 5, peer 312 is the leader of peer group A, and peer 314 is the leader of the peer group B. The peer group network 906 of FIG. 9 may be a network of those peers in the locality-aware overlay network 902 that are leaders of peer groups.

In an embodiment of the invention, each peer in a peer group is sufficiently close together in the transport network that a measurement of the transport network distance between a peer and the peer group leader is a good approximation of the transport network distance between the peer and each peer in the peer group containing the peer group leader. This peer group coherency may enable a peer searching for a peer group in its transport network locality to rapidly traverse the locality-aware overlay network (e.g., from a random starting point) by querying the network's peer group leaders for transport network locality data. To further enhance locality-aware overlay network traversal, each peer group leader may maintain a list of neighboring peer groups (i.e., peer groups nearby in the transport network) and the transport network distances to those neighboring peer groups. For example, in FIG. 7, the leader of peer group 702 maintains a list containing references to the leaders of peer groups 704, 706 and 708, as well as the measured transport network distance to those peer groups.

The locality-aware peer 600 searching for a peer group in its transport network locality, having found at least one peer group, may check if the peer group is in its locality by querying the candidate peer group (e.g., by querying the peer group leader) for references to the candidate peer group's neighboring peer groups as well as the transport network distances to those neighboring peer groups as measured from the candidate peer group. The peer 600 may then measure the transport network distances from itself to the peer groups neighboring the candidate peer group. If the transport network distances as measured by the peer 600 are the same (to within a tolerance, e.g., 10 milliseconds roundtrip time, or 1 transport network hop) as the transport network distances as supplied by the candidate peer group, then, in an embodiment of the invention, the peer 600 has found a peer group in its transport network locality. The peer groups in the peer group network act as dynamic landmarks for the searching peer 600. The peer 600 may join the peer group by, for example, further querying the leader of the peer group for a list of peers in the peer group with which to establish overlay network connections. If the peer group neighbor distances as measured by the peer 600 do not match those supplied by the candidate peer group, then the peer 600 has a list of new candidate peer groups (i.e., the neighbors of the rejected candidate peer group) to check and may, for example, select the candidate peer group with the minimum measured transport network distance to try next.

Figure 10:
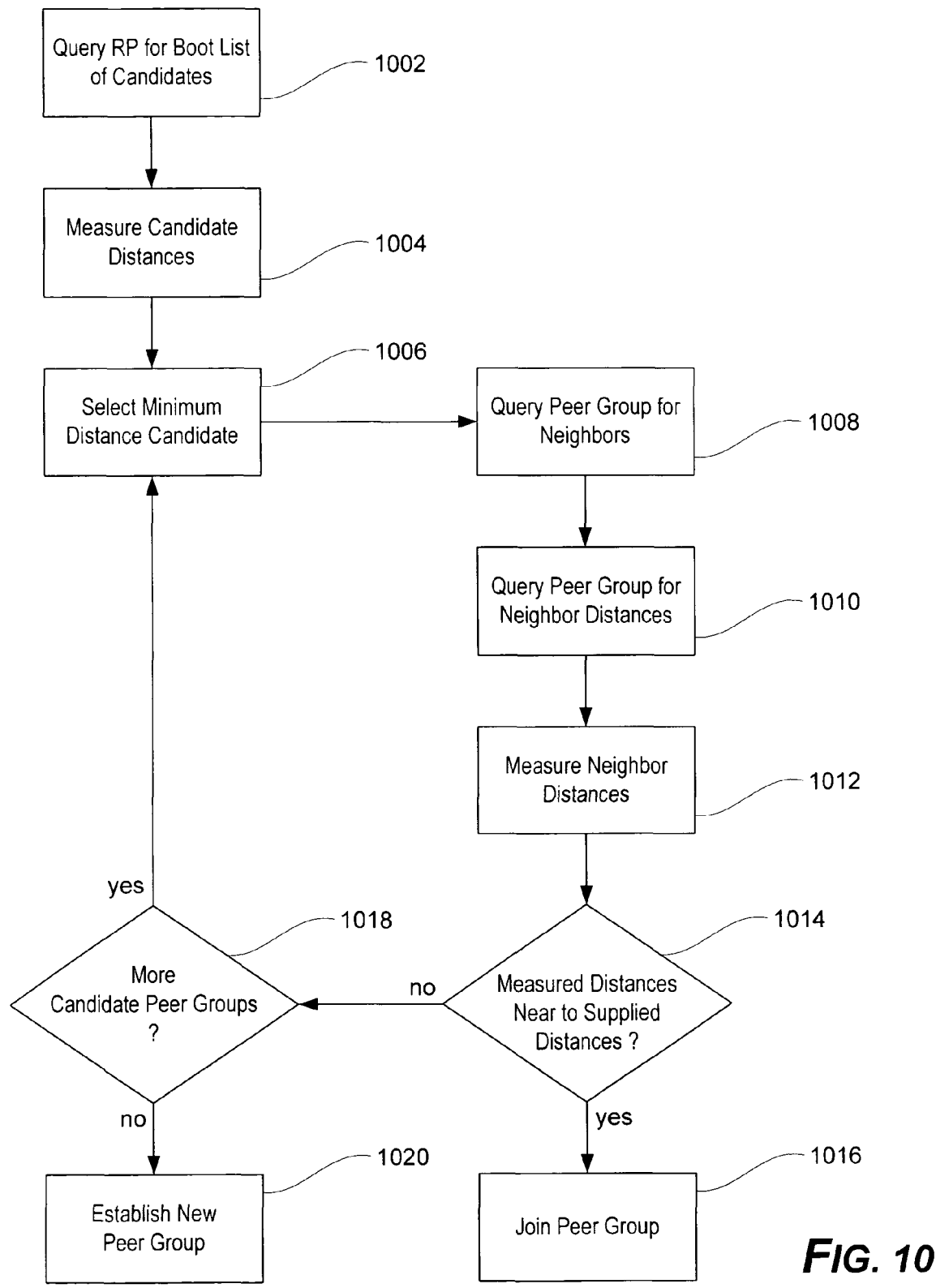
FIG. 10 is a flowchart depicting example steps performed by a locality-aware peer when joining a locality-aware overlay network in accordance with an embodiment of the invention.

FIG. 10 depicts an example procedure performed by the locality-aware peer 724 (FIG. 7) that employs this strategy when joining the locality-aware overlay network 700 in accordance with an embodiment of the invention. The join locality-aware overlay module 602 of FIG. 6 may perform the procedure depicted by FIG. 10. The locality-aware peer 724 joining the locality-aware overlay network 700 may obtain initial reference to at least one peer group in the locality-aware overlay network 700 in a number of ways. A computer user may input the transport network address of a peer group leader directly, for example, an Internet protocol (IP) address, a transport network domain name, or a uniform resource locator (URL). Alternatively, each locality-aware peer 724 may have reference to a rendezvous point (RP) (e.g., the rendezvous point 722) for the locality-aware overlay network 700 which may be obtained, for example, via DHCP or its overlay network analog. In the example depicted by FIG. 10, a boot list of one or more candidate peer groups is obtained from the rendezvous point 722 for the locality-aware overlay network 700 at step 1002.

At step 1004, the peer 724 measures the transport network distance between itself and each of the candidate peer groups in the boot list. For example, the peer 724 may send an explicit Measure message to the leader of each peer group and, upon receiving a reply to the Measure message, calculate the round trip time. In an embodiment of the invention, the inter-group maintenance module 608 (FIG. 6) is responsible for responding to Measure messages and the like. Other suitable methods of measuring transport network distance may be employed as will be appreciated by one of skill in the art. At step 1006, the peer group in the current set of candidate peer groups with the minimum measured transport network distance from the peer 724 is selected as the next peer group to check. If the peer 724 has an initial reference directly to a peer group in the overlay network (e.g., other than from the rendezvous point) then the peer 724 may bypass steps 1002, 1004 and 1006 and begin at step 1008.

At step 1008, the peer 724 queries the selected peer group for references to the selected peer group's neighboring peer groups. For example, the peer 724 may send the leader of the selected peer group an explicit Get Neighboring Peer Groups message and receive references to the neighboring peer groups in reply. For example, if the peer 724 sends the Get Neighboring Peer Groups message to the leader of peer group 702 then, in an embodiment of the invention, the peer 724 receives a list of the leaders of peer groups 704, 706 and 708 in reply. In an embodiment of the invention, the inter-group maintenance module 608 (FIG. 6) is responsible for responding to Get Neighboring Peer Groups messages and the like.

At step 1010, the peer 724 queries the selected peer group for the transport network distances to the selected peer group's neighboring peer groups as measured by the selected peer group. For example, the peer 724 may send the leader of the selected peer group an explicit Get Neighboring Peer Group Distances message and receive the transport network distance for each neighboring peer group in reply. For example, if the peer 724 sends the Get Neighboring Peer Group Distances message to the leader of peer group 702 then, in an embodiment of the invention, the peer receives the transport network distances from peer group 702 to peer group 704, from peer group 702 to peer group 706 and from peer group 702 to peer group 708 in reply. In an embodiment of the invention, the inter-group maintenance module 608 (FIG. 6) is responsible for responding to Get Neighboring Peer Group Distances messages and the like.

In an embodiment of the invention, each peer group leader maintains, in its inter-group cache 610 (FIG. 6), a list of peer group leaders in neighboring peer groups as well as the transport network distances to each neighboring peer group leader. Establishing and maintaining the list of neighboring peer groups is described below in more detail with reference to FIG. 11. The inter-group maintenance module 608 may regularly update the transport network distances by, for example, regularly sending Measure messages to each peer group leader in the list. In an embodiment of the invention, requesting a copy of the inter-group cache 610 of the leader of the selected peer group provides at least the same information as the messages of steps 1008 and 1010 described above. Cache synchronization between peers of an overlay network may be supported by conventional overlay network protocols.

At step 1012, the peer 724 measures the transport network distances between itself and each of the neighboring peer groups of the selected peer group. For example, the peer 724 may send Measure messages to the leaders of each of the neighboring peer groups. For example, if the peer 724 is considering peer group 702 of FIG. 7 then the peer 724 may send Measure messages to the leaders of peer groups 704, 706 and 708. At the completion of step 1012, the peer 724 has: a list of the neighboring peer groups of the selected peer group, the transport network distance from the selected peer group to each of those neighboring peer groups (the supplied distances), and the transport network distance from the peer to each of those neighboring peer groups (the measured distances).

At step 1014, the peer 724 compares each of the supplied distances to its corresponding measured distance. For example, if the peer 724 is considering peer group 702, the peer 724 first compares the transport network distance between peer group 702 and peer group 704, as supplied by peer group 702, to the transport network distance between the peer 724 and peer group 704, as measured by the peer 724. Next the peer 724 compares the transport network distance between peer group 702 and peer group 706, as supplied by peer group 702, to the transport network distance that the peer 724 measures between itself and peer group 706. Then the peer 724 compares the transport network distance between peer group 702 and peer group 708, as supplied by peer group 702, to the transport network distance between the peer and peer group 708, as measured by the peer 724. If, for each comparison, the absolute value of the difference (i.e., the value ignoring sign) is less than a threshold value (e.g., 10 milliseconds) then the selected peer group is determined to be in the transport network locality of the peer 724 and the procedure progresses to step 1016 where the peer 724 joins the selected peer group. Otherwise, the currently selected peer group is determined not to be in the transport network locality of the peer 724 and the procedure progresses to step 1018.

At step 1018, the peer 724 examines the remaining set of candidate peer groups to determine if any are suitable for locality testing. It may be that all suitable candidates have already been tested or that too many (e.g., 10) peer groups have already been tested without finding a peer group in the peer's 724 locality. If there are no suitable candidate peer groups remaining, then the procedure progresses to step 1020 where the peer 724 establishes a new peer group with itself as the first member. If the set of candidate peer groups does still include suitable candidates then the procedure returns to step 1006 where the suitable candidate with the minimum measured transport network distance from the peer 724 is selected for the next round of locality testing.

For example, if the peer 724 is seeking to join overlay network 700 and the rendezvous point 722 provides peer group 702 as the starting point for the locality search then the peer 724 queries peer group 702 for the neighboring peer groups of peer group 702 and receives peer groups 704, 706 and 708 in reply. In an embodiment of the invention, these peer groups 704, 706 and 708 become the set of candidate peer groups for the next round of locality testing. If peer group 702 fails the locality test of step 1014 then the peer 724 selects the peer group in the set of candidate peer groups that is closest to the peer in the transport network as measured by the peer 724 in step 1012.

In this example, peer group 708 is the closest of the peer groups 704, 706 and 708. As a result, the peer 724 selects peer group 708 to be tested and queries peer group 708 for its neighbors. In overlay network 700, the neighboring peer groups of peer group 708 are peer groups 702 and 710. In an embodiment of the invention, peer group 702 has already been tested and rejected, so it is not a suitable candidate, but peer group 710 is added to the set of candidate peer groups. The transport network distance to peer group 710 is measured as part of the procedure of testing peer group 708. If peer group 708 fails the locality test of step 1014 then, in an embodiment of the invention, the peer 724 selects the closest of peer groups 704, 706 and 710 to be tested next.

If peer group 710 is the closest, the peer group network search proceeds to peer group 710. In querying peer group 710 for its neighbors, peer groups 712, 714 and 716 are added to the set of candidate peer groups and so on until one of the peer groups passes the locality test, each of the peer groups in the locality-aware overlay network fails the locality test, or the peer 724 reaches a peer group network search limit in terms of time (e.g., 10 seconds), number of peer groups tested (e.g., 10) or the like. In an embodiment of the invention, peer groups already tested are not excluded from the set of candidate peer groups and if one of the peer groups that has already been tested is determined to be the best (i.e., minimum distance) candidate then the peer 724 establishes a new peer group with that peer group as the first neighbor of the new peer group.

In an embodiment of the invention, establishing a new peer group includes generating a new peer group identifier (ID) and establishing overlay network connections to a number of the new peer group's nearest neighbors. The nearest peer groups to the new peer group may be found with a variation of the method described above with reference to FIG. 10. Having iterated through a peer group network and having decided to establish a new peer group rather than join one of the existing peer groups, the peer 600 may have reference to the closest existing peer group (e.g., the last tested peer group). This closest existing peer group may become the new peer group's first neighbor. The new peer group may then query this first neighbor for its neighbors, measure their distances from the new peer group and select the closest of them for the new peer group's second neighbor. The new peer group may then query this second neighbor for its neighbors and so on until, for example, the new peer group has a suitable number of connected neighbors (e.g., 6 neighbors), the new peer group has connected to each of the peer groups in the locality-aware overlay network, or the peer group has connected to each peer group within a transport network distance boundary (e.g., 1000 milliseconds or 7 transport network hops).

Figure 11:
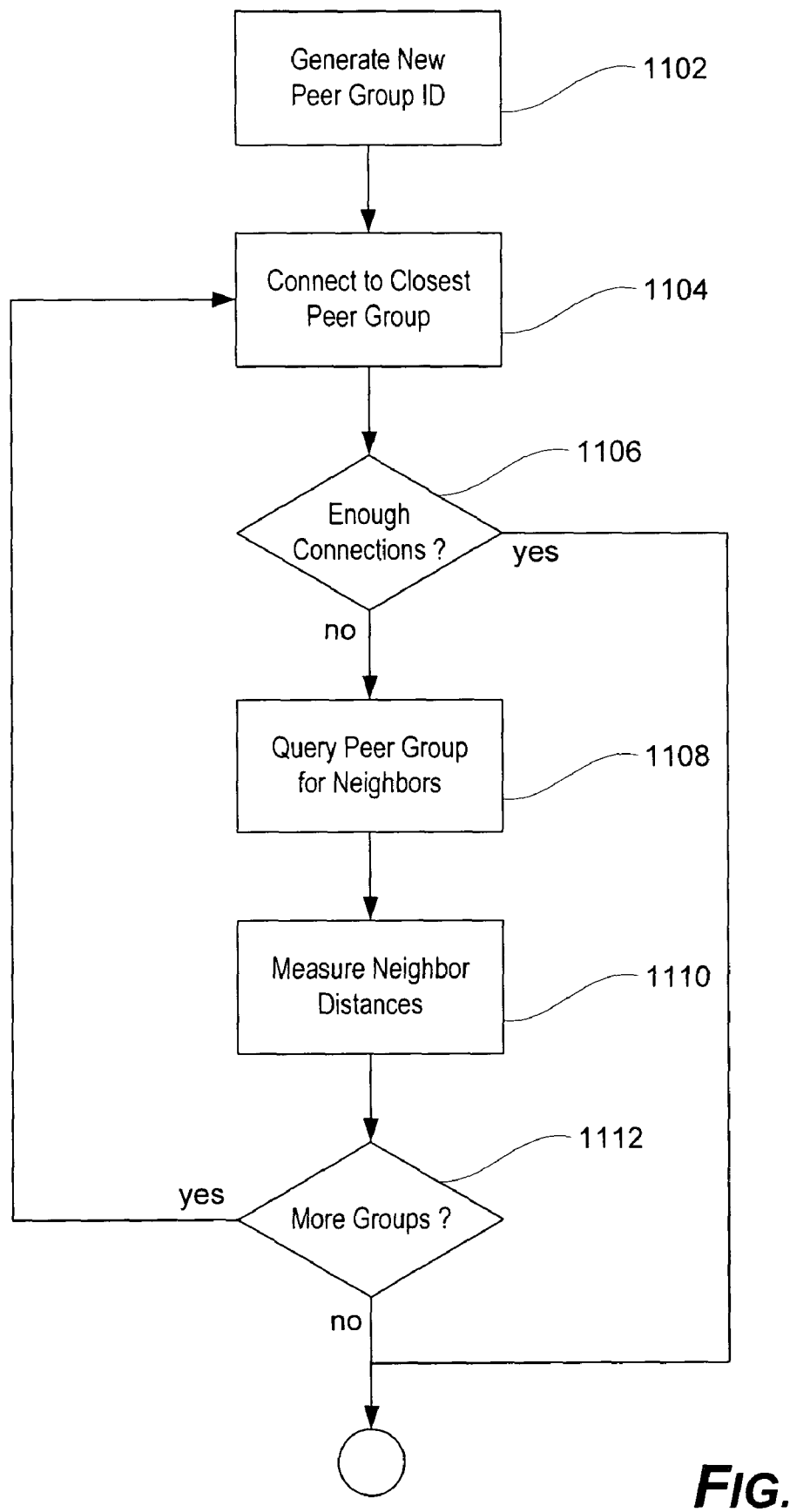
FIG. 11 is a flowchart depicting example steps performed by a locality-aware peer when establishing a new peer group in a locality-aware overlay network in accordance with an embodiment of the invention.

FIG. 11 depicts an example procedure for establishing a new peer group in a locality-aware overlay network in accordance with an embodiment of the invention. The join locality-aware overlay module 602 of FIG. 6 may perform the procedure depicted by FIG. 11. At step 1102, the peer 724 (FIG. 7) establishing the new peer group generates a new peer group identifier with a method similar to the conventional generation of peer identifiers, for example, the peer group identifier may be a globally unique identifier (GUID) generated with methods known in the art. At step 1104, the peer 724 establishes an overlay network connection to the leader of the closest known existing peer group in the overlay network. For example, the peer 724 may have utilized the method described with reference to FIG. 10 to traverse the locality-aware overlay network 700. Starting at peer group 702, the peer 724 may have considered each of peer groups 708, 710, 714, 718 and 720 in turn, but each peer group having failed the peer's 724 locality test, the peer 724 determines to establish a new peer group with itself as the first member. In this example, peer group 720 is the closest known existing peer group in the overlay network 700, so the peer 724 establishes its first overlay network connection to peer group 720, for example, to the leader of peer group 720.

At step 1106, the peer 724 checks if it has reached its target number of inter-group connections. The target number of inter-group connections may vary depending on the requirements of an application utilizing the locality-aware overlay network but, in an embodiment of the invention, it is at least 2 and often higher. If the target has been met then this aspect of establishing the new peer group is complete. Otherwise the procedure progresses to step 1108 to obtain candidate neighbors. If, at some time in the future, one or more of the established connections to neighboring peer groups is lost, the peer 724 may re-enter this procedure, for example, at step 1106, in order to restore the number of inter-group connections to the target number.

At step 1108, the peer 724 queries its new neighbor for a list of the new neighbor's neighbors in a manner similar to step 1008 of FIG. 10. For example, if peer group 720 of FIG. 7 is the new peer group's first neighbor then the new peer group queries peer group 720 for a list of its neighbors and receives a reference to peer group 718 and to the new peer group itself in reply. In an embodiment of the invention, these neighbors of the first neighboring peer group become candidate neighbors for the new peer group. In subsequent iterations, the results of neighbor queries may be added to the list of candidate neighbors. At step 1110, the peer 724 measures the transport network distance from itself to each of the new candidate neighbors in a manner similar to step 1012 of FIG. 10. For example, having queried peer group 720 of FIG. 7 for its neighbors, the peer 724 measures the transport network distance to peer group 718.

At step 1112, the peer 724 checks its list of candidate neighbors to determine if any are suitable candidates. It may be that the new peer group has established overlay network connections to each of the peer groups of the locality-aware overlay network without reaching its target number of inter-group connections. It may be that the new peer group has established peer group level connections to each of the peer groups within a transport network distance limit. If there are no suitable neighbor candidates then the peer 724 may exit the procedure depicted in FIG. 11. Otherwise, the procedure returns to step 1104 where the peer 724 selects the closest of the candidate peer groups as a new neighbor for the new peer group. If the procedure exits without establishing the target number of inter-group connections, the leader of the new peer group may periodically re-enter this procedure, for example, at step 1104, to search for new neighbors.

In an embodiment of the invention, the peer that establishes a new peer group becomes the first leader of that peer group. The establishing peer may remain the leader of the peer group indefinitely, but if the establishing peer leaves the locality-aware overlay network (e.g., by disconnecting from the transport network) then, in an embodiment of the invention, another peer group member takes on the role. If there are no other peer group members then the peer group may cease to exist.

In an embodiment of the invention, the peer group leader establishes and maintains a leadership list. The leadership list may include a number of references to peers that are members of the peer group. The leadership list need not include each member of the peer group. In an embodiment of the invention, the leadership list is stored in the intra-group cache 606 (FIG. 6) of the locality-aware peer 600. The peer establishing the peer group may add itself as the first member of the leadership list as part of the process of establishing the peer group.

When a new peer seeks to join the peer group, the new peer may query the peer group leader for a list of candidate peers with which to establish intra-group overlay network connections or, at least, to query for additional candidates if the candidate peers have reached their connection maximums. For example, the new peer may send a Get Peer Group Members message to the peer group leader and receive the current leadership list in reply. In an embodiment of the invention, the intra-group maintenance module 604 is responsible for responding to Get Peer Group Members messages and the like. If the overlay network incorporates a peer cache synchronization protocol, the new peer may obtain the list of candidate intra-group peers by synchronizing its intra-group cache 606 with the intra-group cache 606 of the peer group leader. If the leadership list includes less than a target number of peers (e.g., 10) then the new peer may be added to the leadership list as a result of querying the peer group leader for the list of candidate intra-group peers.

Each peer in the peer group may have a copy of the leadership list. If the current peer group leader leaves the peer group (e.g., leaves the overlay network) then, in an embodiment of the invention, the peer that is next in the leadership list becomes the peer group leader. The new peer group leader may remove the old peer group leader from the leadership list and add a new peer to the bottom of the leadership list. In an embodiment of the invention, the peer group leader periodically (e.g., every 5 seconds) sends an Alive message to each peer in the peer group, for example, by utilizing conventional overlay network flooding-style message propagation within the peer group. If the Alive message is not received within a time period (e.g., 10 seconds) then, in an embodiment of the invention, the current group leader is determined to have left the peer group.

It may be that each of the peers in the leadership list leaves the peer group so that the peer group is left leaderless and without clear succession. In this situation, each peer remaining in the peer group may attempt to become the new peer group leader. For example, once the situation has been detected through lack of Alive messages, each peer may wait a random amount of time (e.g., 0 to 10 seconds) and then send a New Leader message if such a message has not already been received from another peer in the peer group. In an embodiment of the invention, the peer that sends out the New Leader message with the earliest timestamp is the new leader. A number of rounds may be required because two or more peers in the peer group may send out the New Leader message within a time period (e.g., 1 second). In an embodiment of the invention, the intra-group maintenance module 604 is responsible for the processing of Alive messages and the like.

Each peer in the peer group may have a copy of the list of peer group leaders in neighboring peer groups. The new peer group leader may re-establish the inter-group overlay network connections to the leaders of neighboring peer groups in the list. Alternatively, the new peer group leader may perform the procedure discussed above with reference to FIG. 11 to re-establish inter-group connections.

For example, with reference to FIG. 5, peer 314 is the leader of the peer group in transport network locality 404. Peer 314 was the first member of the peer group and, as part of the process of establishing the new group, peer 314 added itself to the leadership list stored in its intra-group cache. When peer 308 joined the peer group, it queried peer 314 for a list of candidate intra-group peers. As a result, peer 314 added peer 308 to second place in the leadership list and returned itself as a candidate peer with which to establish an intra-group overlay network connection. Peer 308 did establish an overlay network connection with peer 314. Peer 304 was next to join the peer group and then peer 310. Each time a similar sequence of actions occurred. If peer 314 left the peer group, peer 308 would become the peer group leader and would re-establish the inter-group connection to peer 312.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer-readable storage medium having embodied thereon computer-executable instructions, the computer-executable instructions when executed at a peer comprising a computing device, configure the peer to perform actions comprising;

querying, from the peer, an overlay network peer group for a first set of transport network distances between the overlay network peer group and one or more overlay network peer group neighbors of the overlay network peer group, wherein:

the overlay network peer group comprises one or more locality-aware peers each having locality-awareness comprising information regarding the one or more overlay network peer group neighbors and the one or more peers within the overlay network peer group; and each of the one or more overlay network peer group neighbors of the overlay network peer group has a direct overlay network connection to the overlay network peer group;

measuring, at the peer, a second set of transport network distances from the peer to each of the one or more overlay network peer group neighbors of the overlay network peer group; and determining, at the peer, to join the overlay network peer group if, for each transport network distance in the first set of transport network distances, an absolute value of a difference between the transport network distance in the first set of transport network distances and a corresponding transport network distance in the second set of transport network distances is less than a threshold transport network distance value.

2. The computer-readable storage medium of claim 1, wherein a transport network distance between a first node and a second node in a transport network comprises a round-trip time for a message between the first node and the second node.

3. The computer-readable storage medium of claim 1, wherein a transport network distance between a first node and a second node in a transport network comprises transport network latency between the first node and the second node.

4. The computer-readable storage medium of claim 1, wherein a transport network distance between a first node and a second node in a transport network comprises a count of transport network routing hops between the first node and the second node.

5. The computer-readable storage medium of claim 1, wherein:
   each overlay network peer group comprises a peer group leader;
   the transport network distance between the peer and an overlay network peer group comprises the transport network distance between the peer and the peer group leader of the overlay network peer group; and
   the transport network distance between a first overlay network peer group and a second overlay network peer group comprises the transport network distance between the peer group leader of the first overlay network peer group and the peer group leader of the second overlay network peer group.

6. The computer-readable storage medium of claim 1, wherein the actions further comprise:
   if the peer does not join the overlay network peer group, adding the one or more overlay network peer group neighbors of the overlay network peer group to a list of candidates; and
   selecting an overlay network peer group having the closest transport network distance from the peer in the list of candidates as the next overlay network peer group to be considered for joining.

7. The computer-readable storage medium of claim 6, wherein the actions further comprise determining to establish a new overlay network peer group if, after testing each selected candidate, the peer has not joined an existing overlay network peer group.

8. A computerized system, comprising:
   a processor;
   a memory coupled to the processor; and
   a join locality-aware overlay module stored on the memory and operable to configure the processor to, at least, determine that an overlay network peer joins an overlay network peer group, if, for each transport network distance in a first set of transport network distances, an absolute value of a difference between the transport network distance in the first set of transport network distances and a corresponding transport network distance in is physically or temporally near to a second set of transport network distances is less than a threshold transport network distance value, wherein:
      the first set of transport network distances comprises transport network distances from the overlay network peer group to one or more overlay network peer group neighbors each having a direct overlay network connection to the overlay network peer group;
      the second set of transport network distances comprises transport network distances measured from the overlay network peer to the one or more overlay network peer group neighbors; and
      the locality-awareness for each peer in the overlay network peer group comprises:
         information regarding the one or more overlay network peer group neighbors; and
         information regarding the one or more peers within the locality-aware overlay network peer group.

9. The computerized system of claim 8, wherein the join locality-aware overlay module is further configured to, at least:
   query the overlay network peer group for the first set of transport network distances; and
   measure each transport network distance in the second set of transport network distances.

10. The computerized system of claim 8, wherein the locality-awareness further comprises an ordered leadership list listing at least one overlay network peer in an overlay network peer group that will become, in the listed order, a leader of the overlay network peer group.

11. The computerized system of claim 8, further comprising an intra-group maintenance module configured to, at least, determine if a current leader of an overlay network peer group has left the overlay network peer group.

12. The computerized system of claim 8, further comprising an inter-group cache that comprises:
   a list of at least one overlay network peer group neighbor of an overlay network peer group; and
   for each neighbor in the list, a measured transport network distance between the overlay network peer group and the neighbor.

13. The computerized system of claim 8, further comprising an inter-group maintenance module configured to, at least, periodically measure a transport network distance between an overlay network peer group and each overlay network peer group neighbor of the overlay network peer group.

14. A computer-implemented method, comprising:
   determining a peer to join a locality-aware overlay network peer group comprising one or more peers having locality-awareness of the overlay network peer group if, for each transport network distance in a first set of transport network distances, an absolute value of a difference between the transport network distance in the first set of transport network distances and a corresponding transport network distance in a second set of transport network distances is less than a threshold transport network distance value, wherein:
      the first set of transport network distances comprises transport network distances from the overlay network peer group to one or more overlay network peer group neighbors each having a direct overlay network connection to the overlay network peer group;
      the second set of transport network distances comprises transport network distances measured from the peer to the one or more overlay network peer group neighbors; and
      the locality-awareness for each peer in the overlay network peer group comprises:
         information regarding the one or more overlay network peer group neighbors; and
         information regarding the one or more peers within the locality-aware overlay network peer group.

15. The method of claim 14, further comprising:
   querying the overlay network peer group for the first set of transport network distances; and
   measuring each transport network distance in the second set of transport network distances.

16. A computer-readable medium having thereon computer-executable instructions for performing the method of claim 14.

17. The computerized system of claim 8, wherein a transport network distance between a first node and a second node in an overlay network comprises one or more of:
- a round-trip time for a message between the first node and the second node;
- transport network latency between the first node and the second node; and
- a count of transport network routing hops between the first node and the second node.

18. The method of claim 14, wherein a transport network distance between a first node and a second node in an overlay network comprises one or more of:
- a round-trip time for a message between the first node and the second node;
- transport network latency between the first node and the second node; and
- a count of transport network routing hops between the first node and the second node.

* * * * *